United States Patent
Wang

(10) Patent No.: US 11,250,694 B2
(45) Date of Patent: Feb. 15, 2022

(54) VEHICLE CONTROL METHOD, COMPUTER DEVICE AND STORAGE MEDIUM

(71) Applicant: BEIJING BAIDU NETCOM SCIENCE AND TECHNOLOGY CO., LTD., Beijing (CN)

(72) Inventor: Ya Wang, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 135 days.

(21) Appl. No.: 16/748,329

(22) Filed: Jan. 21, 2020

(65) Prior Publication Data

US 2020/0234569 A1    Jul. 23, 2020

(30) Foreign Application Priority Data

Jan. 21, 2019 (CN) .......................... 201910053716.0

(51) Int. Cl.
   *G08G 1/16* (2006.01)
   *G08G 1/005* (2006.01)
   (Continued)

(52) U.S. Cl.
   CPC .......... *G08G 1/005* (2013.01); *G05D 1/0223* (2013.01); *G05D 1/0276* (2013.01); *G05D 2201/0213* (2013.01)

(58) Field of Classification Search
   CPC ... G08G 1/16; B60Q 5/00; B60Q 1/50; B60Q 9/00; B60W 30/09; B60W 30/085
   See application file for complete search history.

(56) References Cited

U.S. PATENT DOCUMENTS

2015/0291216 A1* 10/2015 Sato .................. B62D 15/0265
                                                                  701/23
2016/0148511 A1*  5/2016 Shibata ............ G08G 1/096758
                                                                 701/119
(Continued)

FOREIGN PATENT DOCUMENTS

CN      103832434 A    6/2014
CN      104210489 A   12/2014
(Continued)

OTHER PUBLICATIONS

Chinese Patent Application No. 201910053716.0, Office Action dated Mar. 3, 2020, 8 pages.
(Continued)

*Primary Examiner* — Tan Q Nguyen
(74) *Attorney, Agent, or Firm* — Lathrop GPM LLP

(57) ABSTRACT

The present disclosure provides a vehicle control method, a computer device and a storage medium. The method includes: when a moving direction of a pedestrian is detected to be toward an intersection in front of a vehicle during driving of the vehicle, determining a first time required for the pedestrian to move from a current position of the pedestrian and a second time required for the vehicle to move from a current position of the vehicle to the front intersection according to a current motion state of the pedestrian and a current driving state of the vehicle, respectively, determining a control strategy of the vehicle according to a distance range to which a first distance between the vehicle and the intersection belongs, the first time and the second time, and when the vehicle drives toward the intersection, controlling the vehicle to make, according to the distance between the vehicle and the intersection, a prompt corresponding to the distance to the pedestrian.

15 Claims, 5 Drawing Sheets

(51) Int. Cl.
*G05D 1/02* (2020.01)
*B60Q 1/50* (2006.01)

(56) References Cited

U.S. PATENT DOCUMENTS

2018/0276986 A1* 9/2018 Delp ................ G08G 1/005
2019/0310633 A1* 10/2019 Toyoda ............. B60Q 1/04

FOREIGN PATENT DOCUMENTS

| | | |
|---|---|---|
| CN | 105374231 A | 3/2016 |
| CN | 106652556 A | 5/2017 |
| CN | 106794792 A | 5/2017 |
| CN | 106864361 A | 6/2017 |
| CN | 107731009 A | 2/2018 |
| CN | 108263280 A | 7/2018 |
| CN | 108447304 A | 8/2018 |
| CN | 108604420 A | 9/2018 |

OTHER PUBLICATIONS

Chinese Patent Application No. 201910053716.0, English translation of Office Action dated Mar. 3, 2020, 10 pages.
Chinese Patent Application No. 201910053716.0, Second Office Action dated Sep. 29, 2020, 10 pages.
Chinese Patent Application No. 201910053716.0, English translation of Second Office Action dated Sep. 29, 2020, 13 pages.

* cited by examiner

US 11,250,694 B2

VEHICLE CONTROL METHOD, COMPUTER DEVICE AND STORAGE MEDIUM

CROSS-REFERENCE TO RELATED APPLICATION

This application claims priority to and benefits of Chinese Patent Application Serial No. 201910053716.0, filed with the State Intellectual Property Office of P. R. China on Jan. 21, 2019, the entire content of which is incorporated herein by reference.

FIELD

The present disclosure relates to a technical field of vehicle control, and more particularly, to a vehicle control method, a computer device and a storage medium.

BACKGROUND

When a vehicle is traveling on a road, it is inevitable to interact with pedestrians on the road. Traditional people-vehicle interactions outside the vehicle usually mean that a driver expresses his/her driving intentions by means of headlights or honking. When the vehicle is close to a pedestrian, the driver may also interact with the pedestrian through gestures, expressions and the like.

However, in unmanned driving, there is no driver. When an unmanned vehicle is close to the pedestrian, requirements for people-vehicle interaction in a small distance cannot be satisfied by means of headlights or honking, etc.

SUMMARY

An embodiment of the present disclosure provides a vehicle control method, including:

when a current moving direction of a pedestrian is detected to be toward an intersection in front of a vehicle during driving of the vehicle, determining a first time required for the pedestrian to move from a current position of the pedestrian to the front intersection according to a current motion state of the pedestrian;

predicting a second time required for the vehicle to arrive at the intersection according to a current driving state of the vehicle, in which the current driving state of the vehicle includes a current first driving speed of the vehicle and a first distance between a current position of the vehicle and the intersection;

determining a control strategy of the vehicle according to a distance range to which the first distance belongs, the first time and the second time, in which the control strategy includes a mapping relationship between the distance from the vehicle to the front intersection and a prompt mode; and controlling the vehicle to prompt the pedestrian according to the control strategy when the vehicle drives toward the intersection.

An embodiment of the present disclosure provides a vehicle control apparatus, including:

a first determination module, configured to, when a current moving direction of a pedestrian is detected to be toward an intersection in front of a vehicle during driving of the vehicle, determine a first time required for the pedestrian to move from a current position of the pedestrian to the front intersection according to a current motion state of the pedestrian;

a prediction module, configured to predict a second time required for the vehicle to arrive at the intersection according to a current driving state of the vehicle, in which the current driving state of the vehicle includes a current first driving speed of the vehicle and a first distance between a current position of the vehicle and the intersection;

a second determination module, configured to determine a control strategy of the vehicle according to a distance range to which the first distance belongs, the first time and the second time, in which the control strategy includes a mapping relationship between the distance from the vehicle to the intersection and a prompt mode; and a control module, configured to control the vehicle to prompt the pedestrian according to the control strategy when the vehicle drives toward the intersection.

An embodiment of the present disclosure provides a computer device including a processor and a memory.

The processor is configured to execute a program corresponding to an executable program code by reading the executable program code stored in the memory, so as to implement a vehicle control method as described in the aforementioned embodiment according to an aspect of the present disclosure.

An embodiment the present disclosure provides a computer readable storage medium having a computer program stored thereon. When the program is executed by a processor, a vehicle control method as described in the aforementioned embodiment according to an aspect of the present disclosure is implemented.

Additional aspects and advantages of the present disclosure will be given in the following description, some of which will become apparent from the following description or be learned from practices of the present disclosure.

BRIEF DESCRIPTION OF THE DRAWINGS

The foregoing and/or additional aspects and advantages of the present disclosure become obvious and easily understood from descriptions of the embodiments with reference to the following accompanying drawings.

DETAILED DESCRIPTION

Figure 1:
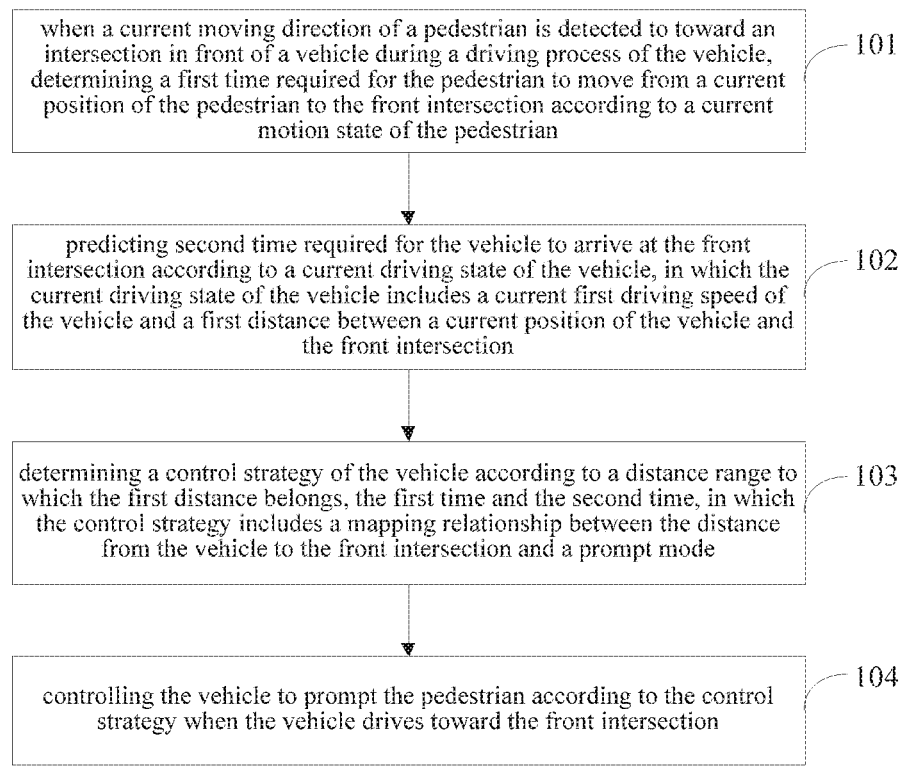
FIG. 1 is a flowchart of a vehicle control method according to an embodiment of the present disclosure.

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In normal driving or unmanned driving in which case there is no driver. When a vehicle is close to the pedestrian, requirements for people-vehicle interaction in a small distance cannot be satisfied by means of headlights or honking, etc., so that the driving safety and reliability of the vehicle are reduced.

Therefore, embodiments of the present disclosure provide a vehicle control method, a vehicle control apparatus, a computer device and a storage medium.

A vehicle control method, a vehicle control apparatus, a computer device and a storage medium according to embodiments of the present disclosure are described below with reference to the accompanying drawings.

FIG. 1 is a flowchart of a vehicle control method according to an embodiment of the present disclosure.

The vehicle control method according to the embodiment of the present disclosure may be executed by a vehicle control apparatus according to an embodiment of the present disclosure. The apparatus may be configured in a computer device, so that different prompts may be given to a pedestrian according to a distance between a vehicle and an intersection ahead the vehicle when the vehicle drives to the intersection. In this manner, the pedestrian may move according to the prompts, thereby greatly improving the safety and the reliability of vehicle driving.

As illustrated in FIG. 1, the vehicle control method includes the following actions.

At block 101, when a current moving direction of a pedestrian is detected to toward an intersection in front of a vehicle during a driving process of the vehicle, a first time required for the pedestrian to move from a current position of the pedestrian to the front intersection is determined according to a current motion state of the pedestrian.

The vehicle in this embodiment may be an unmanned vehicle, or a conventional vehicle requiring a driver.

During the driving process of the vehicle, environment data around the vehicle may be continuously acquired by, for example, a radar and a camera arranged on the vehicle. When a pedestrian is detected by the vehicle, the vehicle determines whether the moving direction of the pedestrian faces the intersection in front of the vehicle. In detail, the moving direction of the pedestrian may be determined according to positions of the pedestrian detected by the radar at adjacent moments, and it is determined whether the moving direction of the pedestrian faces the intersection ahead. For example, when the moving direction of the pedestrian is parallel to a driving direction of the vehicle, it may be considered that the pedestrian does not move toward the intersection ahead of driving.

When it is detected that the current moving direction of the pedestrian is toward the intersection in front of the vehicle, it indicates that the pedestrian wants to move toward the intersection to cross the road. Consequently, the first time required for the pedestrian to move from his/her current position to the front intersection is determined according to the current motion state of the pedestrian.

The current motion state of the pedestrian includes, but is not limited to: a current position of the pedestrian, a distance between the pedestrian and the front intersection, a current moving speed of the pedestrian and so on. The first time may be equal to a ratio of the current distance between the pedestrian and the front intersection to the current moving speed of the pedestrian, and may be expressed by an equation $$t_p = \frac{s_p}{v_p},$$

in which, $s_p$ refers to the distance between the pedestrian and the front intersection, $v_p$ refers to a current moving speed of the pedestrian, and $t_p$ refers to the first time required for the pedestrian to move from his/her current position to the front intersection.

Figure 2:
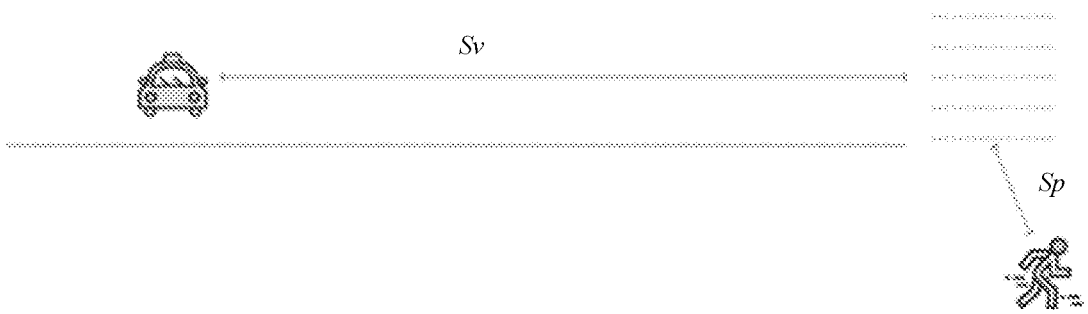
FIG. 2 is a schematic diagram illustrating movement of a vehicle and a pedestrian according to an embodiment of the present disclosure.

FIG. 2 is a schematic diagram illustrating movement of a vehicle and a pedestrian according to an embodiment of the present disclosure. As illustrated in FIG. 2, $s_p$ is a straight-line distance between the pedestrian and the intersection ahead.

It is understood that, in this embodiment, the intersection in front of the vehicle may be an intersection where no traffic light is provided, or an intersection wherein the traffic light does not operate properly.

At block 102, a second time required for the vehicle to arrive at the front intersection is predicted according to a current driving state of the vehicle, in which the current driving state of the vehicle includes a current first driving speed of the vehicle and a first distance between a current position of the vehicle and the front intersection.

In this embodiment, when the vehicle detects that the pedestrian moves toward the intersection in front of the vehicle, the second time required for the vehicle to travel to the intersection ahead may be predicted according to the current driving state of the vehicle. The current driving state of the vehicle includes, but is not limited to: the current driving speed of the vehicle, which is referred to as the first driving speed, the first distance between the vehicle and the intersection, a current acceleration of the vehicle, and the like.

When predicting the second time, the time required for the vehicle to move from the current position of the vehicle to the intersection ahead may be calculated by assuming that the vehicle travels at the first driving speed, which may be expressed as an equation $$t_v = \frac{s_v}{v_v},$$

in which $s_v$ refers to the first distance between the vehicle and the intersection ahead currently, $v_v$ refers to the first driving speed of the vehicle, and $t_v$ refers to the second time required for the vehicle to move from the current position of the vehicle to the intersection ahead.

As illustrated in FIG. 2, $s_v$ refers to a current straight-line distance between the vehicle and the intersection ahead.

At block 103, a control strategy of the vehicle is determined according to a distance range to which the first distance belongs, the first time and the second time, in which the control strategy includes a mapping relationship between the distance from the vehicle to the front intersection and a prompt mode.

In this embodiment, the control strategy of the vehicle may be determined according to the distance between the vehicle and the front intersection and the time required for the pedestrian and the vehicle to arrive at the intersection in front when the vehicle detects that the moving direction of the pedestrian faces the front intersection.

For example, when the vehicle is 120 m away from the intersection and it is detected that a certain pedestrian moves toward the intersection in front of the vehicle, it is determined which one of the vehicle and the pedestrian arrives at the intersection first according to the time required for the vehicle to travel to the intersection at a current speed of the vehicle and the time required for the pedestrian to move to the intersection. If the vehicle does not arrive at the intersection when the pedestrian reaches the intersection with a current speed of the pedestrian, the vehicle may continue to travel at the current speed of the vehicle without decelerating.

In practical applications, the vehicle interacts with the pedestrian usually by honking or flaring vehicle lights or by gestures or expressions of a driver when the vehicle is close to the pedestrian. However, as there is no driver in the unmanned vehicle, human-vehicle interaction requirements may not be met simply by vehicle-level operations such as flaring the vehicle lights or honking.

In this embodiment, the determined control strategy may include the mapping relationship between the distance from the vehicle to the front intersection and the prompt mode. That is, the distance between the vehicle and the intersection ahead has a correspondence relationship with the prompt mode. For example, the prompt mode varies with the distance range to which the distance between the vehicle and the front intersection belongs, thus enriching the prompt modes.

At block 104, the vehicle is controlled to prompt the pedestrian according to the control strategy when the vehicle drives toward the front intersection.

In this embodiment, in the driving process of the vehicle moving toward the intersection ahead, the vehicle may be controlled to prompt the pedestrian according to the correspondence between the distance from the vehicle to the intersection ahead and the prompt mode in the control strategy. In detail, in the driving process of the vehicle, the vehicle may be controlled to prompt the pedestrian according to the prompt mode corresponding to the current distance based on the distance between the vehicle and the front intersection. Therefore, in the driving process of the vehicle, different prompts may be given to the pedestrian according to different distances between the vehicle and the front intersection, thus the safety and the reliability of vehicle driving are improved.

With the vehicle control method of the embodiment of the present disclosure, when the moving direction of the pedestrian is detected to face the intersection in front of a vehicle during the driving of the vehicle, the first time required for the pedestrian to move from his/her current position to the front intersection and the second time required for the vehicle to move from a current position of the vehicle to the front intersection according to the current motion state of the pedestrian and the current driving state of the vehicle are determined, respectively, the control strategy of the vehicle is determined according to the distance range to which the first distance between the vehicle and the front intersection belongs, the first time and the second time, and the vehicle to is controlled make a prompt corresponding to the distance to the front intersection according to the distance between the vehicle and the front intersection when the vehicle drives to the front intersection, so that different prompts may be given to the pedestrian according to different distances between the vehicle and the intersection during the process of the vehicle driving toward the front intersection. Thus the pedestrian may move according to the prompt, greatly improving the safety and the reliability of vehicle driving.

Figure 3:
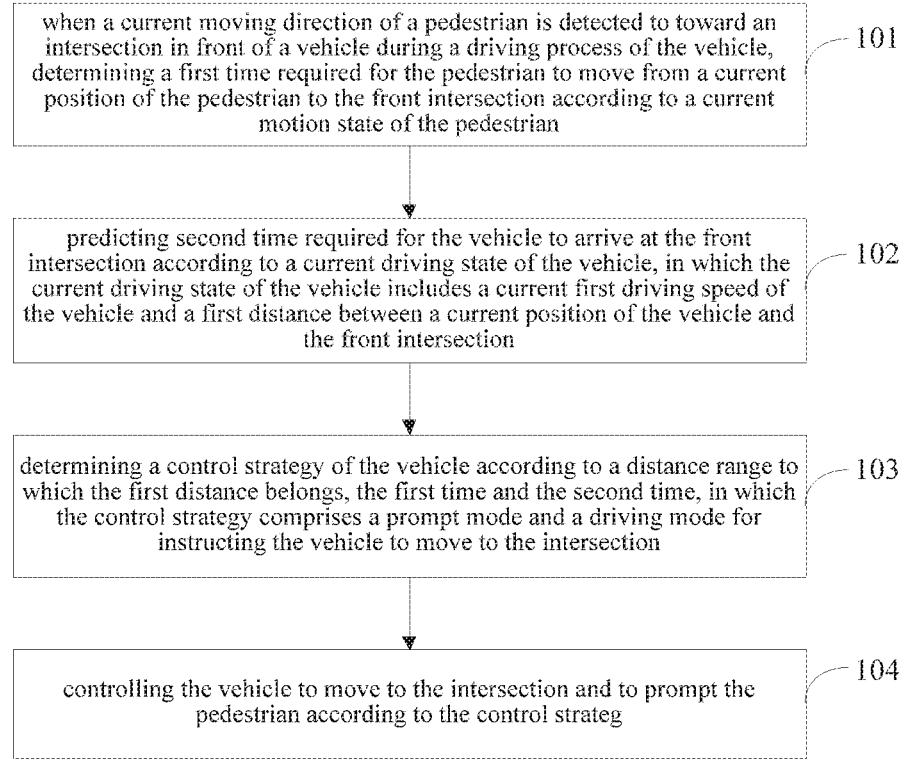
FIG. 3 is a flowchart of a vehicle control method according to an embodiment of the present disclosure.

FIG. 3 is a flowchart of a vehicle control method according to an embodiment of the present disclosure. As illustrated in FIG. 3, the vehicle control method includes following actions.

At block 301, when a current moving direction of a pedestrian is detected to toward an intersection in front of a vehicle during a driving process of the vehicle, a first time required for the pedestrian to move from a current position of the pedestrian to the front intersection is determined according to a current motion state of the pedestrian.

At block 302, a second time required for the vehicle to arrive at the front intersection is predicted according to a current driving state of the vehicle, in which the current driving state of the vehicle includes a current first driving speed of the vehicle and a first distance between a current position of the vehicle and the front intersection.

At block 303, a control strategy of the vehicle is determined according to a distance range to which the first distance belongs, the first time and the second time, in which the control strategy comprises a prompt mode and a driving mode for instructing the vehicle to move to the intersection.

At block 304, the vehicle is controlled to move to the intersection and to prompt the pedestrian according to the control strategy.

In an embodiment of the present disclosure, there may be a mapping relationship between the distance range to which the distance between the vehicle and the intersection belongs and the prompt mode. When the vehicle travels to different distance ranges of the intersection ahead, an exterior vehicle prompting component may be configured to provide different prompts to the pedestrian. The exterior vehicle prompting component includes but is not limited to: a light strip, vehicle lights, a display screen, a ray light, a speaker and so on.

In detail, when the distance between the vehicle and the front intersection is greater than a first threshold and is less than or equal to a second threshold, a prompt is given by using vehicle lights or a light strip, or both the vehicle lights and the light strip. When the distance between the vehicle and the front intersection is greater than a third threshold and is less than or equal to the first threshold, an image-text prompt is performed by using a display screen or a ray light, or the display screen and the ray light. When the distance between the vehicle and the front intersection is less than the third threshold, the image-text prompt is performed by using the display screen.

The display screen may be arranged at a front grille outside the vehicle and is configured to display characters and/or patterns. The ray light is configured to map the patterns and/or the characters on the ground through rays.

Figure 4:
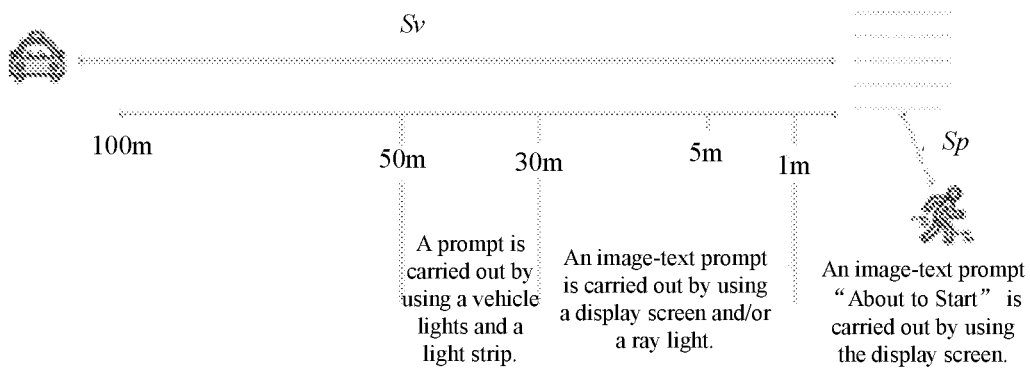
FIG. 4 is schematic diagram illustrating prompts of a vehicle according to an embodiment of the present disclosure.

For example, the first threshold is 30 m, the second threshold is 50 m, and the third threshold is 1 m. FIG. 4 is a schematic diagram illustrating prompts of a vehicle according to an embodiment of the present disclosure. During the deceleration process of the vehicle, as illustrated in FIG. 4, when the vehicle travels to a range of 30 m to 50 m away from the intersection, vehicle lights or headlights and the light strip around the top of the vehicle may be used to prompt the pedestrian that the vehicle is approaching to the intersection. When the vehicle travels to a range of 1 m to 30 m away from the intersection, the pedestrian may be prompted in an image-text mode through displaying patterns and characters on a display screen, such as displaying characters "After You" and a dynamic pattern showing a pedestrian is walking across an intersection. When the vehicle travels to a range less than 1 m away from the intersection, the display screen may be controlled to display characters "About to Start", so as to remind the pedestrian that the vehicle is about to start.

In an embodiment of the present disclosure, through determining a mapping relationship between the distance range to which the distance between the vehicle and the front intersection belongs and the prompt mode, the prompt mode may be continuously adjusted as the vehicle gradually approaches to the intersection. Thus, the pedestrian is prompted in a targeted manner according to the distance between the vehicle and the front intersection, greatly improving the flexibility and intellectualization of the prompt, and improving the driving safety and reliability of the vehicle.

During the process of the vehicle approaching to the front intersection, if it is detected that the pedestrian is approaching to the intersection or arrives at the intersection, the vehicle may need to adjust the driving mode, such as a driving speed, a driving acceleration, etc., to ensure the safety of the pedestrian and the vehicle.

In another embodiment of the present disclosure, the control strategy further includes a driving mode for instructing the vehicle to travel to the intersection ahead. After the control strategy is determined, the vehicle may be controlled to move to the front intersection according to the driving mode of the vehicle. In the process of controlling the vehicle according to the driving mode, the vehicle is controlled to prompt the pedestrian according to the mapping relationship between the distance from the vehicle to the front intersection and the prompt mode, which is included in the control strategy. Therefore, in the process of controlling the vehicle to travel according to the driving mode, the pedestrian is prompted in a targeted manner according to the distance between the vehicle and the front intersection, thus the safety of the vehicle and the pedestrian is ensured.

The following describes how to determine the control strategy of the vehicle when the vehicle detects that the pedestrian moves toward the intersection ahead of the vehicle, and when the first distance between the vehicle and the intersection ahead belongs to different distance ranges. For example, it is set that the fourth threshold>the second threshold>the first threshold>the third threshold.

In an embodiment of the present disclosure, if the first distance is greater than the fourth threshold, the fourth threshold being greater than the second threshold, when the control strategy of the vehicle is determined, a third time required for the vehicle to pass through the front intersection at the first driving speed and a fourth time required for the pedestrian to pass through the front intersection may be determined according to width of a crosswalk at the intersection and width of the intersection.

When the second time is greater than a sum of the first time and the fourth time, it is indicated that the vehicle does not arrived at the intersection yet when the pedestrian passes through the intersection from the current position at the current moving speed. In other words, the vehicle may travel to the intersection ahead at the current first driving speed. That is, it is determined that the driving mode of the vehicle is to drive to the intersection ahead at the first driving speed.

When a sum of the second time and the third time is less than the first time, it is indicated that the pedestrian does not arrive at the intersection yet when the vehicle travels forward and passes through the intersection at the first driving speed. And then the vehicle may travel to the intersection ahead at the current first driving speed. That is, it may be determined that the driving mode of the vehicle is to drive to the intersection ahead at the first driving speed.

When the second time is greater than the first time and is less than or equal to the sum of the first time and the fourth time, it indicates that the pedestrian reaches the front intersection first, and the vehicle also reaches the intersection before the pedestrian passes through the intersection. In order to ensure safety, the vehicle may be controlled to decelerate, i.e. the driving mode of the vehicle may be determined as decelerating to the intersection ahead with a first acceleration.

When the second time is less than or equal to the first time and the sum of the second time and the third time is greater than or equal to the first time, it indicates that the vehicle first reaches the intersection ahead, and the pedestrian also reaches the intersection before the vehicle passes through the intersection. In order to ensure safety, the vehicle may be controlled to drive at a reduced speed, that is, the driving mode of the vehicle is determined as decelerating to the intersection ahead with a second acceleration.

During the deceleration of the vehicle, when the distance between the vehicle and the intersection is greater than the first threshold and less than or equal to the second threshold, the vehicle lights and/or the light strip may be used for prompting. When the distance between the vehicle and the intersection in front is greater than the third threshold and is less than or equal to the first threshold, the display screen and/or the ray lamp is used for performing an image-text prompt to prompt the pedestrian to pass through first. When the distance between the vehicle and the intersection in front is less than the third threshold, the display screen is used for performing an image-text prompt to prompt the pedestrian that the vehicle is about to start to pass through the intersection.

It may be understood that the pedestrian may be prompted by the exterior vehicle prompting component when the driving mode of the vehicle is to drive to the front intersection at the first driving speed. For example, when the vehicle drives to a range of 30 m to 50 m from the intersection ahead, the lights and the light strip are flared. When the vehicle drives to a range of 1 m to 30 m from the intersection ahead, characters "Attention: the vehicle is in motion!" and a pattern suggesting no passing are displayed on the display screen. When the vehicle is less than 1 m from the front intersection, characters "About to Start" are displayed on the display screen.

Based on the above, the prompt mode of the vehicle may be matched with the driving mode of the vehicle, and specific content of the prompt mode may be set according to actual needs.

In another embodiment of the present disclosure, if the first distance is greater than the second threshold and is less than or equal to the fourth threshold, when determining the control strategy of the vehicle, the third time required for the vehicle to pass through the front intersection at the first driving speed and the fourth time required for the pedestrian to pass through the front intersection may be determined first, and the method may be as described above and will not be described herein again.

When the second time is greater than a sum of the first time and the fourth time, it is indicated that the vehicle does not arrived at the intersection yet when the pedestrian passes through the intersection from his/her current position at the current moving speed. In other words, the vehicle can travel to the intersection ahead at the current first driving speed, that is, it is determined that the driving mode of the vehicle is to drive to the intersection ahead at the first driving speed.

When a sum of the second time and the third time is less than the first time, it is indicated that the pedestrian does not arrive at the intersection yet when the vehicle travels forward and passes through the intersection at the first driving speed. And then the vehicle may travel to the intersection ahead at the current first driving speed, that is, it may be determined that the driving mode of the vehicle is to drive to the intersection ahead at the first driving speed.

When the second time is greater than the first time and the second time is less than or equal to the sum of the first time and the fourth time, it is indicated that the pedestrian reaches the intersection ahead first, and the vehicle also reached the intersection before the pedestrian passes through the intersection. In order to ensure the safety of the pedestrian, the vehicle may be controlled to decelerate, that is, it is determined that the driving mode of the vehicle is to decelerate to the front intersection with a third acceleration.

When the second time is less than or equal to the first time and the sum of the second time and the third time is greater than or equal to the first time, it is indicated that the vehicle arrives at the intersection ahead first, and the pedestrian arrives at the intersection before the vehicle passes through the intersection. Since the distance between the vehicle and the intersection is relatively close when the pedestrian is detected by the vehicle, it is determined that the driving mode of the vehicle is to decelerate to the front intersection with a fourth acceleration to stop at the intersection, so as to ensure the safety.

The vehicle is controlled to prompt the pedestrian according to a mapping relationship between the distance from the vehicle to the front intersection and the prompt mode during the process of controlling the vehicle to decelerate to the front intersection according to the driving mode. When the distance between the vehicle and the front intersection is greater than the first threshold and is less than or equal to the second threshold, the pedestrian is prompted by using the vehicle lights and/or the light strip. When the distance between the vehicle and the front intersection is greater than the third threshold and is less than or equal to the first threshold, an image-text prompt is given to the pedestrian by using the display screen and/or the ray light. When the distance between the vehicle and the front intersection is less than the third threshold, the image-text prompt is performed by using the display screen.

It may be understood that in the process of the vehicle heading to the intersection ahead, the pedestrian may be prompted by the exterior vehicle prompting component when the driving mode of the vehicle is to drive to the front intersection at the first driving speed. For example, when the vehicle drives to a range of 30 m to 50 m from the intersection ahead, the lights and the light strip are flared. When the vehicle drives to a range of 1 m to 30 m from the intersection ahead, characters "Attention: the vehicle is in motion!" and a pattern suggesting no passing are displayed on the display screen. When the vehicle is less than 1 m from the front intersection, characters "About to Start" are displayed on the display screen.

In yet another embodiment of the present disclosure, when the first distance is greater than the first threshold and is less than or equal to the second threshold, it is determined whether the second time is greater than the first time when determining the control strategy of the vehicle. That is, it is determined whether the vehicle arrives at the intersection ahead earlier than the pedestrian. When the second time is greater than the first time, it is indicated that the pedestrian arrives at the intersection first. In order to ensure safety, the vehicle should be controlled to decelerate to the front intersection and stop at the intersection. After the pedestrian passes through the intersection, the vehicle starts the engine again, that is, the driving mode of the vehicle is determined as decelerating to the front intersection with a fifth acceleration.

When the second time is less than or equal to the first time, it means that the vehicle arrives at the intersection ahead first or arrives at the intersection ahead simultaneously with the pedestrian. Since the current distance between the vehicle and the intersection ahead is very small, in order to ensure safety, the vehicle may be immediately controlled to decelerate to stop in front of the intersection, that is, the driving mode of the vehicle is determined as decelerating to the front intersection with a sixth acceleration.

When the first distance is greater than the first threshold and is less than or equal to the second threshold, the vehicle runs at the current driving speed. When the vehicle reaches the front intersection first or simultaneously reaches the front intersection with the pedestrian, the deceleration degree of the vehicle is greater than that of the vehicle under the condition that the pedestrian firstly reaches the intersection. Therefore, the sixth acceleration is less than the fifth acceleration. After the control strategy of the vehicle is determined, the vehicle may be controlled to drive to the front intersection in the determined driving mode. When the distance between the vehicle and the front intersection is greater than the third threshold and is less than or equal to the first threshold in the driving process of the vehicle, the display screen and/or the ray light is used for carrying out image-text prompting. When the distance between the vehicle and the front intersection is less than the third threshold, the display screen is used for carrying out the image-text prompting.

In yet another embodiment of the present disclosure, when the first distance is less than or equal to the first threshold, it is indicated that the vehicle is very close to the intersection, and the vehicle should immediately perform deceleration driving and stop in front of the intersection in order to ensure the safety of the pedestrian. The driving mode of the vehicle is determined as decelerating to the front intersection with a seventh acceleration to stop at the intersection.

It may be understood that the first acceleration, the second acceleration, the third acceleration, the fourth acceleration, the fifth acceleration, the sixth acceleration and the seventh acceleration in the embodiments of the present disclosure are all less than zero, and when the vehicle decelerates to the intersection, the process is not limited to uniform deceleration as the driving speed of the vehicle may be adjusted according to actual needs.

For example, the fourth threshold is 100 m, the second threshold is 50 m, the first threshold is 30 m, and the third threshold is 1 m. The following description will be made with reference to FIGS. 4, 5, 6 and 7.

FIG. 4 is a diagram illustrating a case where the first distance is greater than 100 m. During the process of controlling the vehicle to decelerate according to the determined driving mode, a prompt is carried out by the vehicle lights and the light strip when the vehicle is traveling in a range of 30 m to 50 m away from the front intersection. When the vehicle runs to the range of 1 m to 30 m away from the front intersection, the display screen and/or the ray light is used for carrying out an image-text prompt, such as displaying characters "After You" and a dynamic pattern showing a pedestrian is walking across an intersection, so as to prompt the pedestrian to pass first. When the distance between the vehicle and the intersection is less than 1 m, the display screen may be used for carrying out the image-text prompt, such as "About to Start".

Figure 5:
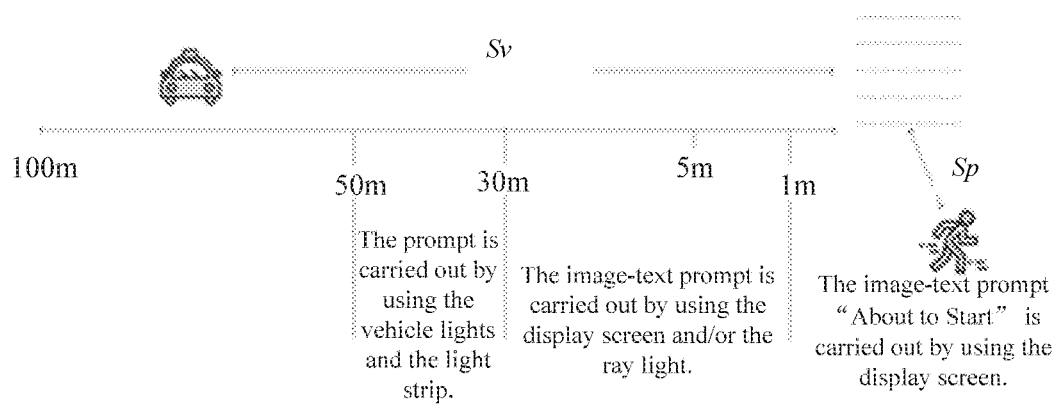
FIG. 5 is schematic diagram illustrating prompts of a vehicle according to an embodiment of the present disclosure.

FIG. 5 is a diagram illustrating a case where the first distance is greater than 50 m and is less than or equal to 100 m. During the process of controlling the vehicle to decelerate according to the determined driving mode, a prompt is carried out by the vehicle lights and the light strip when the vehicle runs to the range of 30 m to 50 m away from the front intersection. When the vehicle runs to the range of 1 m to 30 m away from the front intersection, the display screen and/or the ray light is used for carrying out an image-text prompt, such as displaying characters "After You" and a dynamic pattern showing a pedestrian is walking across an intersection, so as to prompt the pedestrian to pass first. When the distance between the vehicle and the intersection is less than 1 m, the display screen may be used for carrying out the image-text prompt, such as "About to Start".

Figure 6:
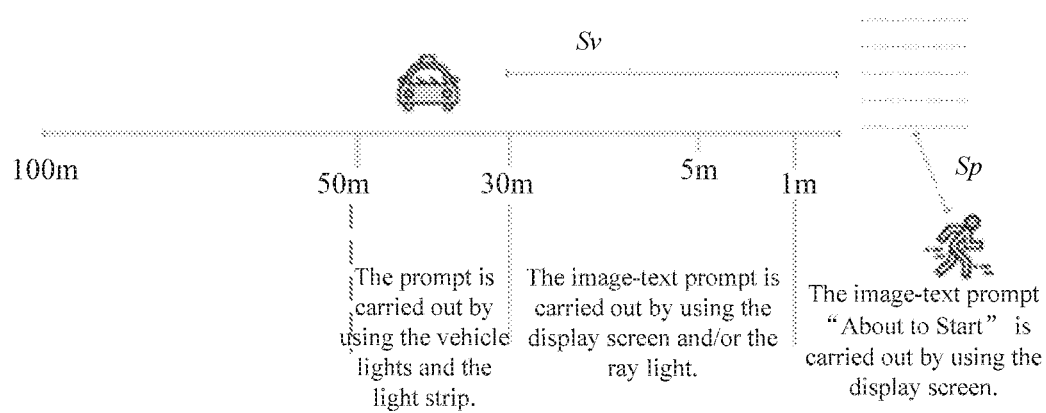
FIG. 6 is schematic diagram illustrating prompts of a vehicle according to an embodiment of the present disclosure.

FIG. 6 is a diagram illustrating a case where the first distance is greater than 30 m and is less than or equal to 50 m. During the process of controlling the vehicle to decelerate according to the determined driving mode, a prompt is carried out by the vehicle lights and the light strip when the vehicle runs to the range of 30 m to 50 m away from the front intersection. When the vehicle runs to the range of 1 m to 30 m away from the front intersection, the display screen and/or the ray light is used for carrying out an image-text prompt, such as displaying characters "After You" and a dynamic pattern showing a pedestrian is walking across an intersection, so as to prompt the pedestrian to pass first. When the distance between the vehicle and the intersection is less than 1 m, the display screen may be used for carrying out the image-text prompt, such as "About to Start".

Figure 7:
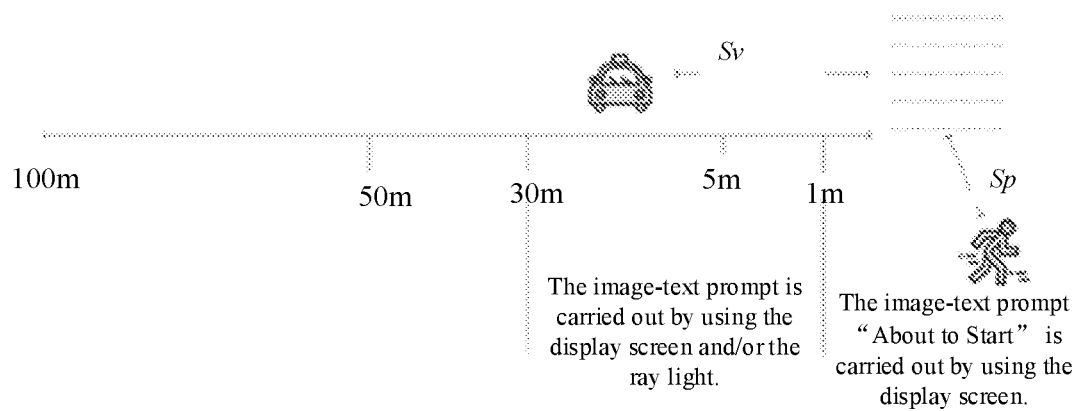
FIG. 7 is schematic diagram illustrating prompts of a vehicle according to an embodiment of the present disclosure.

FIG. 7 is a diagram illustrating a case where the first distance is less than or equal to 30 m. In the process of controlling the vehicle to decelerate according to the determined driving mode, when the vehicle runs to the range of 1 m to 30 m away from the front intersection, the display screen and/or the ray light is used for carrying out an image-text prompt, such as displaying characters "After You" and a dynamic pattern showing a pedestrian is walking across an intersection. When the distance between the vehicle and the intersection is less than 1 m, the display screen may be used for carrying out the image-text prompt, such as "About to Start".

According to the embodiments of the present disclosure, the driving mode of the vehicle may be determined according to the distance range to which the first distance belongs, the first time and the second time, and the pedestrian is prompted according to the mapping relationship between the distance from the front intersection to the vehicle and the prompt mode during the process of controlling the vehicle to drive to the front intersection according to the driving mode, so that the pedestrian may decide whether to move according to the prompt of the vehicle, thus the driving safety and reliability of the vehicle are improved.

Figure 8:
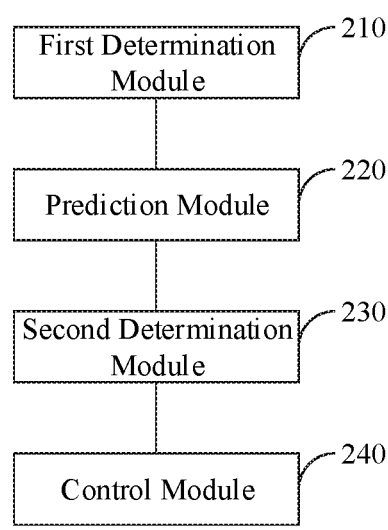
FIG. 8 is a structure diagram of a vehicle control apparatus according to an embodiment of the present disclosure.

To implement the above embodiments, an embodiment of the present disclosure further provides a vehicle control apparatus. FIG. 8 is a structure diagram of a vehicle control apparatus according to an embodiment of the present disclosure.

As illustrated in FIG. 8, the vehicle control apparatus includes: a first determination module 210, a prediction module 220, a second determination module 230 and a control module 240.

The first determination module 210 is configured to, when a current moving direction of a pedestrian is detected to be toward an intersection in front of a vehicle during driving of the vehicle, determine a first time required for the pedestrian to move from a current position of the pedestrian to the front intersection according to a current motion state of the pedestrian.

The prediction module 220 is configured to predict a second time required for the vehicle to move to the front intersection according to a current driving state of the vehicle. The current driving state of the vehicle includes a current first driving speed of the vehicle and a first distance between a current position of the vehicle and the front intersection.

The second determination module 230 is configured to determine a control strategy of the vehicle according to a distance range to which the first distance belongs, the first time and the second time. The control strategy includes a mapping relationship between the distance from the vehicle to the front intersection and a prompt mode.

The control module 240 is configured to control the vehicle to prompt the pedestrian according to the control strategy when the vehicle drives toward the front intersection.

In a possible implementation of the embodiment of the present disclosure, the control strategy includes: when the distance between the vehicle and the front intersection is greater than a first threshold and is less than or equal to a second threshold, giving a prompt with vehicle lights and/or a light strip; when the distance between the vehicle and the front intersection is greater than a third threshold and is less than or equal to the first threshold, giving an image-text prompt by using a display screen and/or a ray light; and when the distance between the vehicle and the front intersection is less than the third threshold, giving the image-text prompt by using the display screen.

In a possible implementation of the embodiment of the present disclosure, the control strategy further includes a driving mode for instructing the vehicle to move to the front intersection; and the control module 240 is further configured to control the vehicle to move to the front intersection according to the driving mode.

In a possible implementation of the embodiment of the present disclosure, when the first distance is greater than a fourth threshold, the second determination module 230 is configured to: determine a third time required for the vehicle to pass through the front intersection at the first driving speed and a fourth time required for the pedestrian to pass through the front intersection; when the second time is greater than a sum of the first time and the fourth time, or when a sum of the second time and the third time is less than the first time, determine that the driving mode of the vehicle is to drive to the front intersection at the first driving speed; when the second time is greater than the first time and the second time is less than or equal to the sum of the first time and the fourth time, determine that the driving mode of the vehicle is to decelerate to the front intersection with a first acceleration; and when the second time is less than or equal to the first time, and when the sum of the second time and the third time is greater than or equal to the first time, determine that the driving mode of the vehicle is to decelerate to the front intersection with a second acceleration.

In a possible implementation of the embodiment of the present disclosure, when the first distance is greater than a second threshold and is less than or equal to a fourth threshold, the second determination module 230 is configured to: determine a third time required for the vehicle to pass through the front intersection at the first driving speed and a fourth time required for the pedestrian to pass through the front intersection; when the second time is greater than a sum of the first time and the fourth time, or a sum of the second time and the third time is less than the first time, determine that the driving mode of the vehicle is to drive to the front intersection at the first driving speed; when the second time is greater than the first time and the second time is less than or equal to the sum of the first time and the fourth time, determine that the driving mode of the vehicle is to decelerate to the front intersection with a third acceleration; and when the second time is less than or equal to the first time and the sum of the second time and the third time is greater than or equal to the first time, determine that the driving mode of the vehicle is to decelerate with a fourth acceleration until the vehicle stops at the front intersection.

In a possible implementation of the embodiment of the present disclosure, when the first distance is greater than a first threshold and is less than or equal to a second threshold, the second determination module 230 is configured to: determine whether the second time is greater than the first time; when the second time is greater than the first time, determine that the driving mode of the vehicle is to decelerate with a fifth acceleration until the vehicle stops at the front intersection; and when the second time is less than or equal to the first time, determine that the driving mode of the vehicle is to decelerate with a sixth acceleration until the vehicle stops at the front intersection, the sixth acceleration being less than the fifth acceleration.

In a possible implementation of the embodiment of the present disclosure, when the first distance is less than or equal to the first threshold, the second determination module 230 is configured to: determine that the driving mode of the vehicle is to decelerate with a seventh acceleration until the vehicle stops at the front intersection.

It should be noted that the above explanation of the embodiments of the vehicle control method is also applicable to the vehicle control apparatus of the embodiment, and therefore, repeated explanation is omitted herein.

With the vehicle control apparatus of the embodiment of the present disclosure, when the moving direction of the pedestrian is detected to face the intersection in front of a vehicle during the driving of the vehicle, the first time required for the pedestrian to move from his/her current position to the front intersection and the second time required for the vehicle to move from a current position of the vehicle to the front intersection according to the current motion state of the pedestrian and the current driving state of the vehicle are determined, respectively, the control strategy of the vehicle is determined according to the distance range to which the first distance between the vehicle and the front intersection belongs, the first time and the second time, and the vehicle to is controlled make a prompt corresponding to the distance to the front intersection according to the distance between the vehicle and the front intersection when the vehicle drives to the front intersection, so that different prompts may be given to the pedestrian according to different distances between the vehicle and the intersection during the process of the vehicle driving toward the front intersection. Thus the pedestrian may move according to the prompt, greatly improving the safety and the reliability of vehicle driving.

In order to implement the foregoing embodiments, an embodiment of the present disclosure further provides a computer device, including a processor and a memory.

The processor is configured to execute a program corresponding to an executable program code by reading the executable program code stored in the memory, so as to implement a vehicle control method as described in the aforementioned embodiments.

Figure 9:
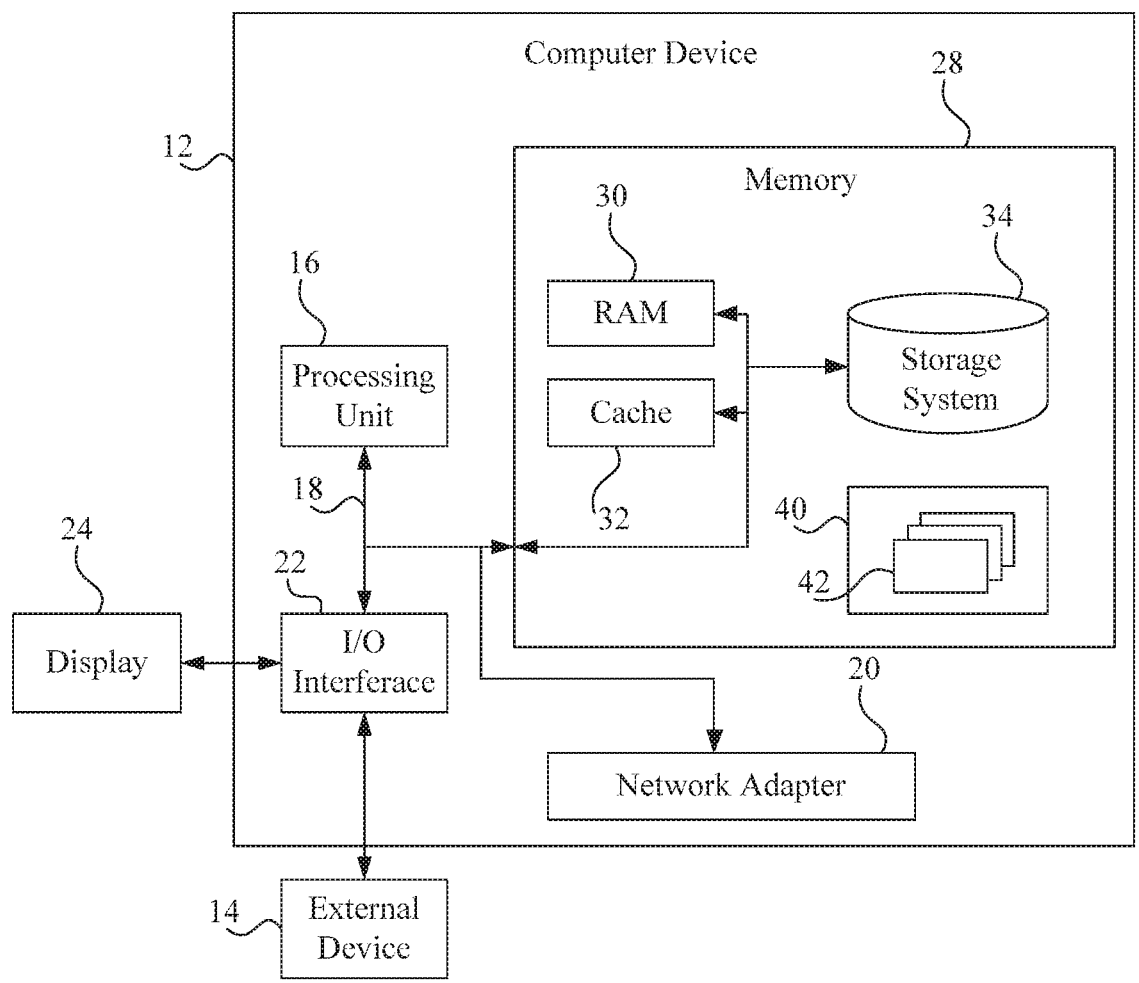
FIG. 9 is a schematic diagram of an exemplary computer device suitable for implementing embodiments of the present disclosure.

FIG. 9 is a schematic diagram of an exemplary computer device suitable for implementing embodiments of the present disclosure. The device 12 illustrated in FIG. 9 is only illustrated as an example, and should not be considered as any restriction on the function and the usage range of embodiments of the present disclosure.

As illustrated in FIG. 9, the device 12 is expressed in the form of a general-purpose computing apparatus. The components of the device 12 may include, but is not limited to, one or more processors or processing units 16, a system memory 28, and a bus 18 connecting different system components (including the system memory 28 and the processing unit 16).

The bus 18 represents one or more of several types of bus architectures, including a memory bus or a memory controller bus, a peripheral bus, a graphic acceleration port (GAP) bus, a processor bus, or a local bus using any bus architecture in a variety of bus architectures. For example, these architectures include, but are not limited to, an industry standard architecture (ISA) bus, a micro-channel architecture (MCA) bus, an enhanced ISA bus, a video electronic standards association (VESA) local bus, and a peripheral component interconnect (PCI) bus.

Typically, the device 12 may include multiple kinds of computer-readable media. These media may be any storage media accessible by the device 12, including transitory or non-transitory storage medium and movable or unmovable storage medium.

The memory 28 may include a computer-readable medium in a form of volatile memory, such as a random access memory (RAM) 30 and/or a high-speed cache memory 32. The device 12 may further include other transitory/non-transitory storage media and movable/unmovable storage media. In way of example only, the storage system 34 may be used to read and write non-removable, non-volatile magnetic media (not shown in the FIG. 9, commonly referred to as "hard disk drives"). Although not illustrated in FIG. 9, a disk driver for reading from or writing to movable and non-volatile magnetic disks (e.g. "floppy disks"), as well as an optical driver for reading and writing movable and non-volatile optical disks (e.g. a compact disc read only memory (CD-ROM), a digital video disc read only Memory (DVD-ROM), or other optical media). In these cases, each driver may be connected to the bus 18 via one or more data medium interfaces. The memory 28 may include at least one program product, which has a set of (for example at least one) program modules configured to perform the functions of embodiments of the present disclosure.

A program/application 40 with a set of (at least one) program modules 42 may be stored in the memory 28, the program modules 42 may include, but not limit to, an operating system, one or more application programs, other program modules and program data, and any one or combination of above examples may include an implementation in a network environment. The program modules 42 are generally configured to implement functions and/or methods described in embodiments of the present disclosure.

The computer device 12 may also communicate with one or more external devices 14 (e.g., a keyboard, a pointing device, a display 24, and etc.) and may also communicate with one or more devices that enable a user to interact with the computer device 12, and/or communicate with any device (e.g., a network card, a modem, and etc.) that enables the computer device 12 to communicate with one or more other computing devices. This kind of communication can be achieved by the input/output (I/O) interface 22. In addition, the computer device 12 may be connected to and communicate with one or more networks such as a local area network (LAN), a wide area network (WAN) and/or a public network such as the Internet through a network adapter 20. As shown in FIG. 9, the network adapter 20 communicates with other modules of the computer device 12 over bus 18. It should be understood that although not shown in the FIGs, other hardware and/or software modules may be used in combination with the computer device 12, which including, but not limited to, a microcode, device drivers, redundant processing units, external disk drive arrays, redundant-arrays-of-independent-disks (RAID) systems, tape drives, as well as data backup storage systems and the like.

The processing unit 16 can perform various functional applications and data processing by running programs stored in the system memory 28, for example, to perform the method provided by embodiments of the present disclosure.

To implement the above embodiments, the embodiment of the present disclosure further provides a computer readable storage medium having a computer program stored thereon. When the program is executed by a processor, the vehicle control method as described in the above embodiments is implemented.

In the description of the specification, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A vehicle control method, comprising:
   when a current moving direction of a pedestrian is detected to be toward an intersection in front of a vehicle during driving of the vehicle, determining a first time required for the pedestrian to move from a current position of the pedestrian to the front intersection according to a current motion state of the pedestrian;
   predicting a second time required for the vehicle to arrive at the intersection according to a current driving state of the vehicle, wherein the current driving state of the vehicle comprises a current first driving speed of the vehicle and a first distance between a current position of the vehicle and the intersection;
   determining a control strategy of the vehicle according to a distance range to which the first distance belongs, the first time and the second time, wherein the control strategy comprises a prompt mode and a driving mode for instructing the vehicle to move to the intersection; and controlling the vehicle to move to the intersection and to prompt the pedestrian according to the control strategy;

wherein, determining the prompt mode comprises:

when the first distance is greater than a first threshold and is less than or equal to a second threshold, performing a prompt with vehicle lights and/or a light strip;

when the first distance is greater than a third threshold and is less than or equal to the first threshold, giving an image-text prompt by using a display screen and/or a ray light; and when the first distance is less than the third threshold, giving the image-text prompt by using the display screen.

2. The method according to claim 1, wherein when the first distance is greater than a fourth threshold, the fourth threshold being greater than the second threshold, determining the driving mode comprises:

determining a third time required for the vehicle to pass through the intersection at the first driving speed and a fourth time required for the pedestrian to pass through the intersection;

when the second time is greater than a sum of the first time and the fourth time, or when a sum of the second time and the third time is less than the first time, determining that the driving mode of the vehicle is to drive to the intersection at the first driving speed;

when the second time is greater than the first time and the second time is less than or equal to the sum of the first time and the fourth time, determining that the driving mode of the vehicle is to decelerate to the intersection with a first acceleration; and when the second time is less than or equal to the first time, and the sum of the second time and the third time is greater than or equal to the first time, determining that the driving mode of the vehicle is to decelerate to the intersection with a second acceleration.

3. The method according to claim 2, wherein when the first distance is greater than the second threshold and is less than or equal to the fourth threshold, determining the driving mode comprises:

determining a third time required for the vehicle to pass through the intersection at the first driving speed and a fourth time required for the pedestrian to pass through the intersection;

when the second time is greater than a sum of the first time and the fourth time, or a sum of the second time and the third time is less than the first time, determining that the driving mode of the vehicle is to drive to the intersection at the first driving speed;

when the second time is greater than the first time and the second time is less than or equal to the sum of the first time and the fourth time, determining that the driving mode of the vehicle is to decelerate to the intersection with a third acceleration; and when the second time is less than or equal to the first time and the sum of the second time and the third time is greater than or equal to the first time, determining that the driving mode of the vehicle is to decelerate with a fourth acceleration until the vehicle stops at the intersection.

4. The method according to claim 1, wherein when the first distance is greater than the first threshold and is less than or equal to the second threshold, determining the driving mode comprises:

determining whether the second time is greater than the first time;

when the second time is greater than the first time, determining that the driving mode of the vehicle is to decelerate with a fifth acceleration until the vehicle stops at the intersection; and when the second time is less than or equal to the first time, determining that the driving mode of the vehicle is to decelerate with a sixth acceleration until the vehicle stops at the intersection, the sixth acceleration being less than the fifth acceleration.

5. The method according to claim 1, wherein when the first distance is less than or equal to the first threshold, determining the driving mode comprises:

determining that the driving mode of the vehicle is to decelerate with a seventh acceleration until the vehicle stops at the intersection.

6. A computer device, comprising a processor and a memory;

wherein the processor is configured to execute a program corresponding to an executable program code by reading the executable program code stored in the memory, so as to implement a vehicle control method, the method comprising:

when a current moving direction of a pedestrian is detected to be toward an intersection in front of a vehicle during driving of the vehicle, determining a first time required for the pedestrian to move from a current position of the pedestrian to the front intersection according to a current motion state of the pedestrian;

predicting a second time required for the vehicle to arrive at the intersection according to a current driving state of the vehicle, wherein the current driving state of the vehicle comprises a current first driving speed of the vehicle and a first distance between a current position of the vehicle and the intersection;

determining a control strategy of the vehicle according to a distance range to which the first distance belongs, the first time and the second time, wherein the control strategy comprises a prompt mode and a driving mode for instructing the vehicle to move to the intersection; and controlling the vehicle to move to the intersection and to prompt the pedestrian according to the control strategy;

wherein determining the prompt mode comprises:

when the first distance is greater than a first threshold and is less than or equal to a second threshold, performing a prompt with vehicle lights and/or a light strip;

when the first distance is greater than a third threshold and is less than or equal to the first threshold, giving an image-text prompt by using a display screen and/or a ray light; and when the first distance is less than the third threshold, giving the image-text prompt by using the display screen.

7. The computer device according to claim 6, wherein when the first distance is greater than a fourth threshold, the fourth threshold being greater than the second threshold, determining the driving mode comprises:

determining a third time required for the vehicle to pass through the intersection at the first driving speed and a fourth time required for the pedestrian to pass through the intersection;

when the second time is greater than a sum of the first time and the fourth time, or when a sum of the second time and the third time is less than the first time, determining that the driving mode of the vehicle is to drive to the intersection at the first driving speed;

when the second time is greater than the first time and the second time is less than or equal to the sum of the first time and the fourth time, determining that the driving mode of the vehicle is to decelerate to the intersection with a first acceleration; and when the second time is less than or equal to the first time, and the sum of the second time and the third time is greater than or equal to the first time, determining that the driving mode of the vehicle is to decelerate to the intersection with a second acceleration.

8. The computer device according to claim 7, wherein when the first distance is greater than the second threshold and is less than or equal to the fourth threshold, determining the driving mode comprises:

determining a third time required for the vehicle to pass through the intersection at the first driving speed and a fourth time required for the pedestrian to pass through the intersection;

when the second time is greater than a sum of the first time and the fourth time, or a sum of the second time and the third time is less than the first time, determining that the driving mode of the vehicle is to drive to the intersection at the first driving speed;

when the second time is greater than the first time and the second time is less than or equal to the sum of the first time and the fourth time, determining that the driving mode of the vehicle is to decelerate to the intersection with a third acceleration; and when the second time is less than or equal to the first time and the sum of the second time and the third time is greater than or equal to the first time, determining that the driving mode of the vehicle is to decelerate with a fourth acceleration until the vehicle stops at the intersection.

9. The computer device according to claim 6, wherein when the first distance is greater than the first threshold and is less than or equal to the second threshold, determining the driving mode comprises:

determining whether the second time is greater than the first time;

when the second time is greater than the first time, determining that the driving mode of the vehicle is to decelerate with a fifth acceleration until the vehicle stops at the intersection; and when the second time is less than or equal to the first time, determining that the driving mode of the vehicle is to decelerate with a sixth acceleration until the vehicle stops at the intersection, the sixth acceleration being less than the fifth acceleration.

10. The computer device according to claim 6, wherein when the first distance is less than or equal to the first threshold, determining the driving mode comprises:

determining that the driving mode of the vehicle is to decelerate with a seventh acceleration until the vehicle stops at the intersection.

11. A computer readable storage medium having a computer program stored thereon, wherein when the program is executed by a processor, a vehicle control method, the method comprising:

when a current moving direction of a pedestrian is detected to be toward an intersection in front of a vehicle during driving of the vehicle, determining a first time required for the pedestrian to move from a current position of the pedestrian to the front intersection according to a current motion state of the pedestrian;

predicting a second time required for the vehicle to arrive at the intersection according to a current driving state of the vehicle, wherein the current driving state of the vehicle comprises a current first driving speed of the vehicle and a first distance between a current position of the vehicle and the intersection;

determining a control strategy of the vehicle according to a distance range to which the first distance belongs, the first time and the second time, wherein the control strategy comprises a prompt mode and a driving mode for instructing the vehicle to move to the intersection; and controlling the vehicle to move to the intersection and to prompt the pedestrian according to the control strategy;

wherein determining the prompt mode comprises:

when the first distance is greater than a first threshold and is less than or equal to a second threshold, performing a prompt with vehicle lights and/or a light strip;

when the first distance is greater than a third threshold and is less than or equal to the first threshold, giving an image-text prompt by using a display screen and/or a ray light; and when the first distance is less than the third threshold, giving the image-text prompt by using the display screen.

12. The storage medium according to claim 11, wherein when the first distance is greater than a fourth threshold, the fourth threshold being greater than the second threshold, determining the driving mode comprises:

determining a third time required for the vehicle to pass through the intersection at the first driving speed and a fourth time required for the pedestrian to pass through the intersection;

when the second time is greater than a sum of the first time and the fourth time, or when a sum of the second time and the third time is less than the first time, determining that the driving mode of the vehicle is to drive to the intersection at the first driving speed;

when the second time is greater than the first time and the second time is less than or equal to the sum of the first time and the fourth time, determining that the driving mode of the vehicle is to decelerate to the intersection with a first acceleration; and when the second time is less than or equal to the first time, and the sum of the second time and the third time is greater than or equal to the first time, determining that the driving mode of the vehicle is to decelerate to the intersection with a second acceleration.

13. The storage medium according to claim 12, wherein when the first distance is greater than the second threshold and is less than or equal to the fourth threshold, determining the driving mode comprises:

determining a third time required for the vehicle to pass through the intersection at the first driving speed and a fourth time required for the pedestrian to pass through the intersection;

when the second time is greater than a sum of the first time and the fourth time, or a sum of the second time and the third time is less than the first time, determining that the driving mode of the vehicle is to drive to the intersection at the first driving speed;

when the second time is greater than the first time and the second time is less than or equal to the sum of the first time and the fourth time, determining that the driving mode of the vehicle is to decelerate to the intersection with a third acceleration; and when the second time is less than or equal to the first time and the sum of the second time and the third time is greater than or equal to the first time, determining that the driving mode of the vehicle is to decelerate with a fourth acceleration until the vehicle stops at the intersection.

14. The storage medium according to claim 11, wherein when the first distance is greater than the first threshold and is less than or equal to the second threshold, determining the driving mode comprises:

determining whether the second time is greater than the first time;

when the second time is greater than the first time, determining that the driving mode of the vehicle is to decelerate with a fifth acceleration until the vehicle stops at the intersection; and when the second time is less than or equal to the first time, determining that the driving mode of the vehicle is to decelerate with a sixth acceleration until the vehicle stops at the intersection, the sixth acceleration being less than the fifth acceleration.

15. The storage medium according to claim 11, wherein when the first distance is less than or equal to the first threshold, determining the driving mode comprises:

determining that the driving mode of the vehicle is to decelerate with a seventh acceleration until the vehicle stops at the intersection.

* * * * *